United States Patent [19]

Piatt

[11] Patent Number: 4,591,874

[45] Date of Patent: May 27, 1986

[54] INK JET PRINTING APPARATUS HAVING IMPROVED HOME STATION DIAGNOSTIC SYSTEM

[75] Inventor: Michael J. Piatt, Enon, Ohio

[73] Assignee: Eastman Kodak Company, Rochester, N.Y.

[21] Appl. No.: 722,553

[22] Filed: Apr. 12, 1985

[51] Int. Cl.$^4$ .......... G01D 15/18

[52] U.S. Cl. .......... 346/75

[58] Field of Search .......... 346/75

[56] References Cited

U.S. PATENT DOCUMENTS 3,992,713 11/1976 Carmichael et al. .......... 346/75

4,418,352 11/1983 Horine et al. .......... 346/75

4,430,658 2/1984 Funazawa et al. .......... 346/75

*Primary Examiner*—E. A. Goldberg

*Assistant Examiner*—Gerald E. Preston

*Attorney, Agent, or Firm*—John D. Husser

[57] ABSTRACT

A home station of an ink jet printing apparatus is adapted to seal operative print head portions from the ambient atmosphere for storage and includes (i) a housing for collecting ink from the print head, during start-up and testing operations, (ii) a sensor for receiving ink droplets and detecting their charge condition and (iii) a fluid handling configuration that electrically decouples the ink in contact with the sensor from ink being returned from the housing for recirculation.

19 Claims, 5 Drawing Figures

INK JET PRINTING APPARATUS HAVING IMPROVED HOME STATION DIAGNOSTIC SYSTEM

BACKGROUND OF THE INVENTION

1. Field of the Invention

The present invention relates to ink jet printing apparatus and more particularly to constructions that provide improved diagnostic capabilities, as well as improved start-up and storage capabilities for such apparatus.

2. Description of the Prior Art

The term "continuous" has been used in the field of ink jet printer apparatus to characterize the types of ink jet printers that utilize continuous streams of ink droplets, e.g. in distinction to the "drop on demand" types. Continuous ink jet printers can be of the binary type (having "catch" and "print" trajectories for droplets of the continuous streams) and of the multi-deflection type (having a plurality of print trajectories for droplets of the continuous streams). Binary type apparatus most often employs a plurality of droplet streams while multi-deflection apparatus most often employs a single droplet stream.

Binary, continuous ink jet printing apparatus have an ink cavity to which ink is supplied under pressure so as to issue in streams from an orifice plate that is in liquid communication with the cavity. Periodic perturbations are imposed on the liquid stream (e.g. vibrations by an electromechanical transducer) to cause the streams to break up into uniformly sized and shaped droplets. Charge electrodes located proximate the stream break-off point are activated to impart electrical charge in accord with a print information signal and nonprinting droplets are deflected into a catcher assembly.

It is important in such apparatus that the break-off point of the ink filaments occurs opposite their respective charge electrodes and that the phase of the filament break-off (i.e. the droplet formation) be properly synchronized with the phase of the information signal that controls activation or nonactivation of the electrodes. A variety of useful approaches for diagnosing proper break-off and synchronization have been developed in the past. U.S. Pat. No. 3,761,941 discloses one system wherein an electrometer, connected to the droplet catcher, is utilized to indicate deviations in phase between droplet break-off and the charging signals. This approach requires that all drops always be receiving a sufficient charge to impart a catching deflection, which can be disadvantageous in implementing some desirable diagnostic/correction approaches.

U.S. application Ser. No. 06/722,551 filed Apr. 12, 1985, and entitled "Ink Jet Printing Apparatus Having a Wet Storage System", discloses a home station, adjacent the operative printing positions of a print head assembly, which is useful for storing that assembly in a wet condition and in collecting ink during start-up operations, for return to the main ink supply.

It has been discovered that by incorporating certain detection and ink handling structures into a home station, such as disclosed in my above-mentioned application, improved diagnostic capabilities can be provided for ink jet printing apparatus.

SUMMARY OF THE INVENTION

Thus, one significant object of my invention is to provide home station configurations that facilitate improved diagnostics in ink jet printing apparatus. In general this object is achieved by providing, in the home station, sensing means to which droplets are directed for charge detection, means for collecting and directing those ink droplets back to the ink supply and means in the home station for electrically isolating the sensing means from the ink returning to the supply. In one preferred embodiment the isolating means includes wall means that separate the collection chamber into an upper, stream-receiving region and a lower, ink discharge region, and orifices are provided to drip ink between those regions in a manner electrically decoupling the sensing means from the grounded ink returning to the ink supply. In another preferred embodiment the upper region is divided into separate reservoirs, each with their own orifices, and the sensing means is constructed to mechanically deflect groups of droplet streams into respectively different reservoirs. In accord with another advantageous feature, the lower region of the isolating means is vented to atmosphere via the upper region and the collection chamber, and the collection chamber is adapted to engage the print head and form an atmospheric seal of both the upper and lower regions, the collection chamber, the sensing means and operative print head portions during wet storage.

DESCRIPTION OF THE DRAWINGS

The subsequent description of preferred embodiments of the present invention refers to the attached drawings wherein.

DETAILED DESCRIPTION OF PREFERRED EMBODIMENTS

Figure 1:
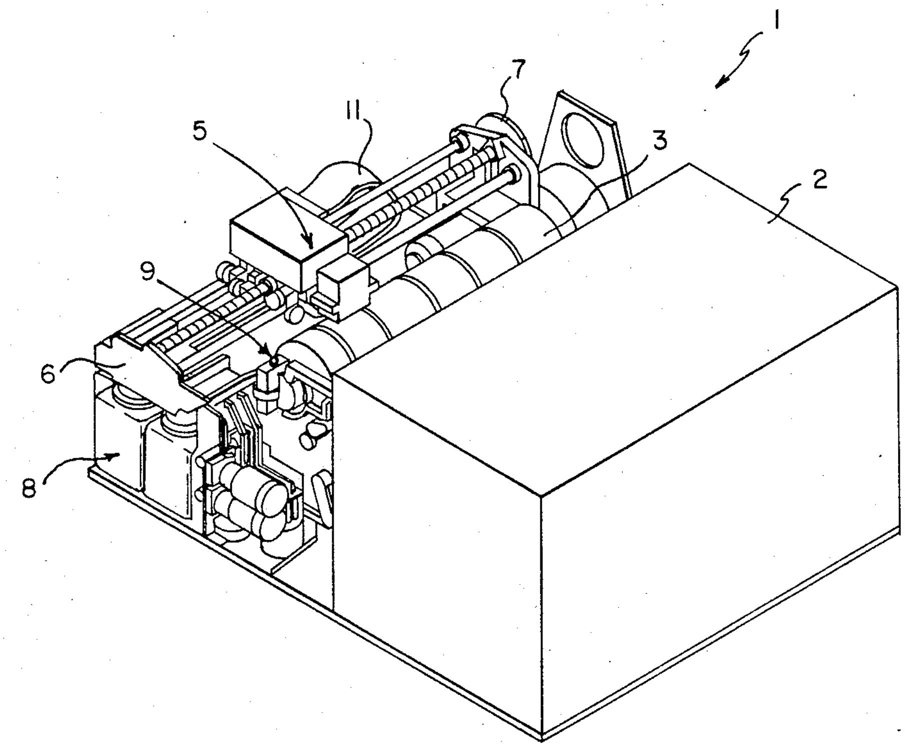
FIG. 1 is a perspective view of one embodiment of ink jet printing apparatus in accord with the present invention.

FIG. 1 illustrates schematically an exemplary ink jet printing apparatus 1 with which the present invention is useful. In general, the apparatus 1 comprises a paper feed and return sector 2 from which sheets are transported into and out of operative relation on printing cylinder 3. The detail structure of the sheet handling components do not constitute a part of the present invention and need not be described further. Also illustrated generally in FIG. 1 is a print head assembly 5 which is mounted for movement on carriage assembly 6 by appropriate drive means 7. During printing operation the print head assembly is traversed across a print path in closely spaced relation to a print sheet which is rotating on cylinder 2. Ink is supplied to and returned from the print head assembly by means of flexible conduits 11, which are coupled to ink cartridge 8. A home station 9, for print head storage and start-up, is constructed adjacent the left side (as viewed in FIG. 1) of the operative printing path of print head assembly 5.

The drive means 7 and carriage assembly 6 are constructed to transport the print head assembly into operative relations with station 9 at appropriate sequences of the operative cycle of apparatus 1 as will be described subsequently.

Figure 2:
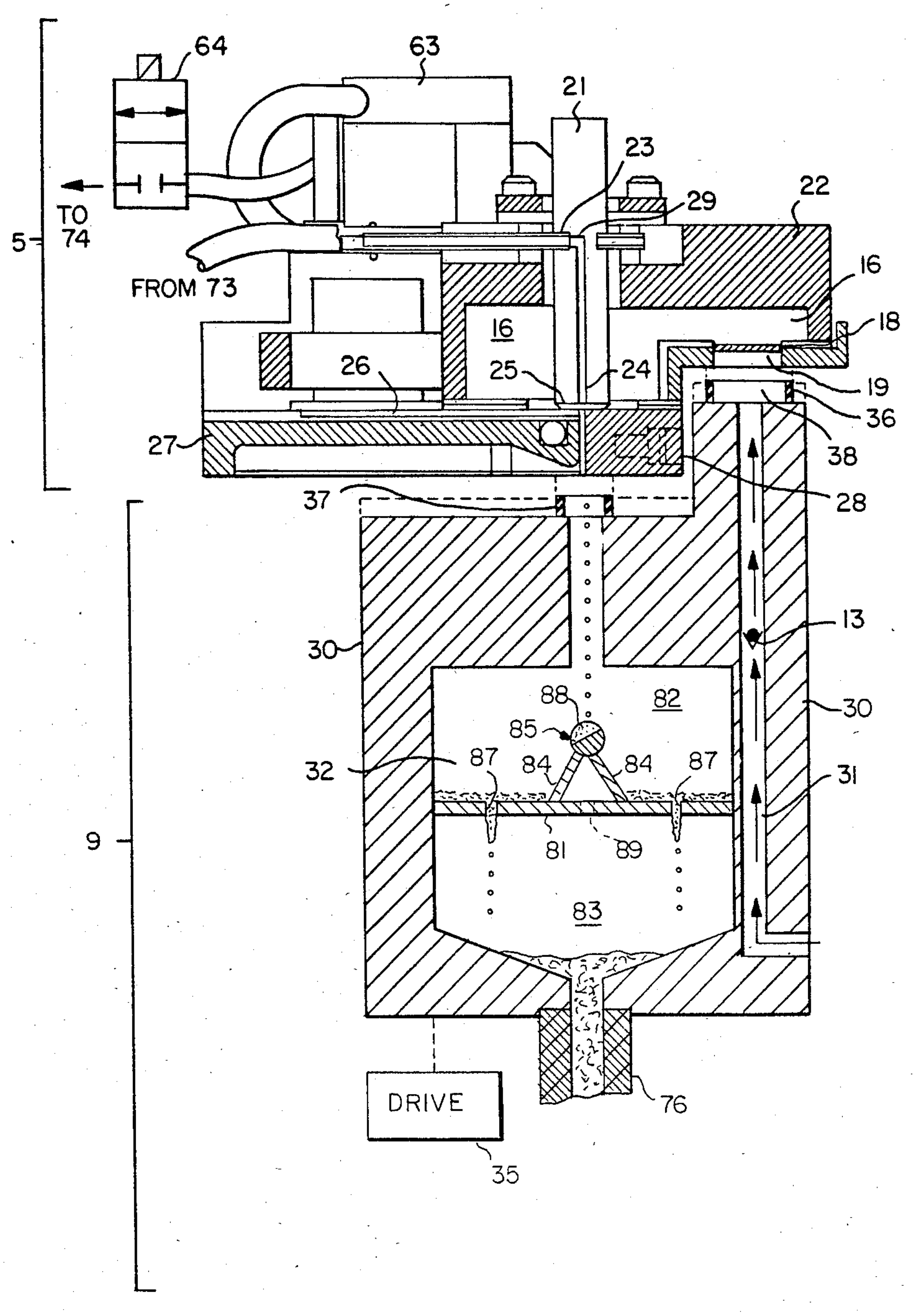
FIG. 2 is a schematic cross-sectional view of a portion of the FIG. 1 apparatus illustrating the upper and lower print head assemblies and their cooperative relation with a home station incorporating one embodiment of the present invention.

Referring briefly to FIG. 2, one embodiment of print head assembly 5, with which the present invention is useful, can be seen in more detail. The assembly 5 includes an upper print head portion including a print head body 21 mounted on housing 22 and having an inlet 23 for receiving ink. The body 21 has a passage leading to a print head cavity 24 and an outlet, not shown, leading from the cavity 24 to an ink circulation system of apparatus 1. The upper print head portion also includes an orifice plate 25 and suitable transducer means (not shown) for imparting mechanical vibration to the body 21. Such transducer can take various forms known in the art for producing periodic perturbations of the ink filament(s) issuing from the orifice plate 25 to assure formation break-up of the ink filaments into streams of uniformly spaced ink droplets. One preferred kind of construction for the print head body and transducer is disclosed in U.S. application Ser. No. 390,105 entitled "Fluid Jet Print Head" and filed June 21, 1982 now Ser. No. 06/777,102 filed Sept. 17, 1985 in the name of Hilarion Braun; however, a variety of other constructions are useful in accord with the present invention. Preferred orifice plate constructions for use in accord with the present invention are disclosed in U.S. Pat. No. 4,184,925; however, a variety of other orifice constructions are useful.

The lower portion of print head assembly 5 includes a charge plate 26 constructed to impart desired charge upon ink droplets at the point of filament break-up and a drop catcher configuration 27 that is constructed and located to catch non-printing droplets (in this arrangement charged droplets). Exemplary preferred charge plate constructions are disclosed in U.S. application Ser. No. 517,608, entitled "Molded Charge Electrode Structure" and filed July 27, 1983 now abandoned, further filed as Ser. No. 06/696,682, now U.S. Pat. No. 4,560,991 in the name of W. L. Schutrum and in U.S. Pat. No. 4,223,321; however, other charge plate constructions are useful in accord with the present invention. Exemplary catcher configurations are described in U.S. Pat. Nos. 3,813,675; 4,035,811 and 4,268,836; again other constructions are useful. Finally, in accord with the present invention, lower print head assembly includes a predeterminedly configured and located wall member 28 which will be described in more detail subsequently.

The ink supply and circulation system of the FIG. 1 apparatus includes various ink conduits (i.e. lines) which form an ink recirculation path. As illustrated schematically in FIG. 3, pump inlet line 71 extends from ink supply cartridge 8 to the inlet of pump 60, outlet line 72 extends between pump 60 and a main filter 69, head supply line 73 extends from main filter 69 to the print head inlet and head return line 74 extends from the print head outlet to a junction between catcher return line 75 and the main ink return line 76. An air bleed line 78 extends from main filter 61 back to cartridge 8 and an ink bypass line 77 extends from a juncture with line 73 also back to cartridge 8. The FIG. 3 system also includes an ink heater 61, a flow restrictor 62, final filter 63, head return valve 64, temperature sensor(s) 65 and pressure sensor 66. As will be clear from the subsequent description, the present invention is not limited to use with the particular ink circulation line arrangement illustrated in FIG. 3.

Figure 3:
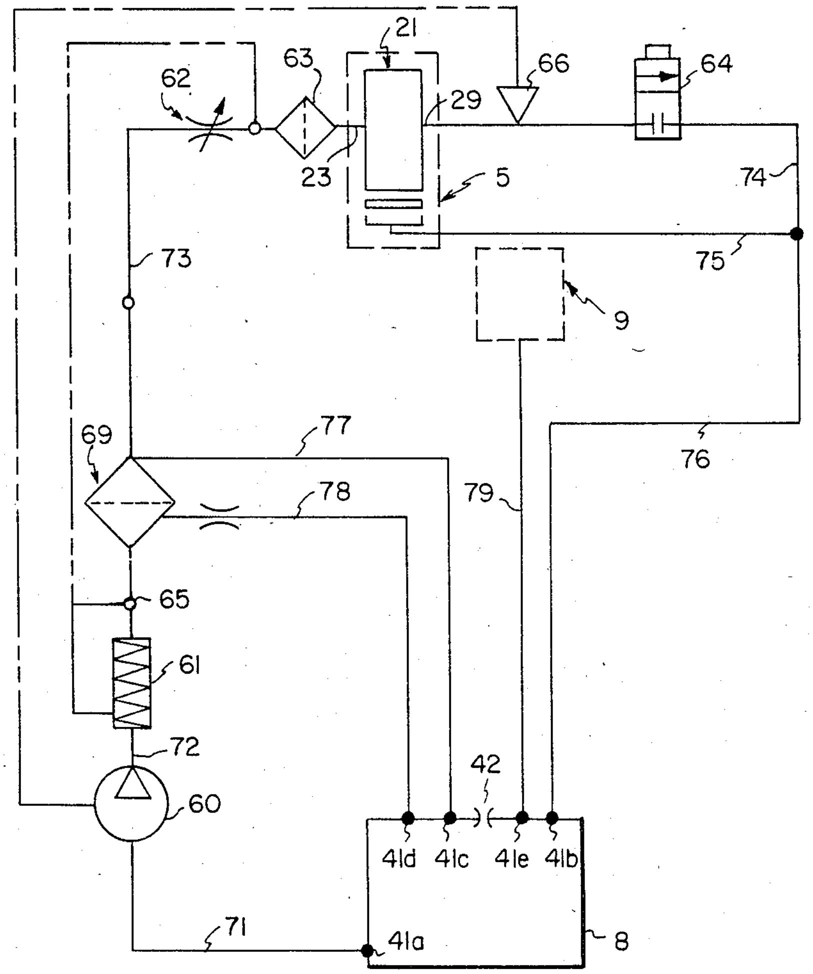
FIG. 3 is a diagrammatic illustration of the ink supply system of the apparatus shown in FIG. 1.

As shown in FIGS. 1 and 3, cartridge 8 can be constructed to be readily inserted and removed, as a unit, from operative relation with lines of the ink circulation system. For this purpose suitable couplings 41*a*, 41*b*, 41*c*, 41*d* and 41*e* are formed on the cartridge 8 in a manner so as to operatively connect with lines 71, 76, 77, and 78 upon insertion of the ink cartridge 8 into its mounting in the printer apparatus. Each cartridge 8 has a suitable opening 42 which can be a vent that renders the interior at atmospheric pressure or can be coupled to a source of vacuum (not shown) to facilitate ink return from lines 76 and 79. An air intake conduit end extends from coupling 41*d* to the cartridge interior to introduce the air bleed from main filter 69 into the cartridge. The cartridge also can comprise, as a unitary portion thereof, a prefilter located between coupling 41*a* and the cartridge interior to filter ink egressing to pump inlet 71.

Heater 61, under the feedback control of sensor(s) 65, conditions the circulating ink to the proper operating temperature and pressure sensor 66 regulates pump 60 to attain the proper ambient line circulation pressure. When valve 64 is closed, ink passing into the print head 20 issues as ink streams from the orifice plate of the print head.

Referring again to FIG. 2, the home station 9 for storage and start-up comprises a housing 30 having an air supply passage 31 and an ink collection chamber 32 formed therein. The housing 30 is located adjacent the printing path of print head assembly so that the print head assembly can be moved to the cooperative position overlying the housing (as shown in FIG. 2) by the translational drive means 7 (FIG. 1). The housing embodiment shown in FIG. 2 is movable toward and away from the print head assembly, e.g. by up-down drive 35; however, various other arrangements to provide the desired interrelations between the home station 9 and print head assembly will occur to one skilled in the art.

As shown in FIG. 2, the housing 30 includes sealing means 36 and 37 which are constructed and located to seal the interface regions of the conduit 31 and collection chamber 32 with the print head assembly from the surrounding atmosphere when the housing is in the upper position. In general, the ink collection chamber 32 is aligned to receive ink issuing from the orifice plate and direct it to return line 76. The conduit 31 is adapted to interfit at neck 38 with a mating inlet inlet 18 formed in the print head assembly. The air inlet 18 includes an air filter 19, which is adapted to filter air from a pressure source 17 prior to its passage through opening 16 for start-up procedures that do not form a part of the present invention. A ball valve 13 is biased to a normally closed position in air conduit 31 and is actuated to an open position by the pressure of the air from source 17 when the air source is on.

Figure 4:
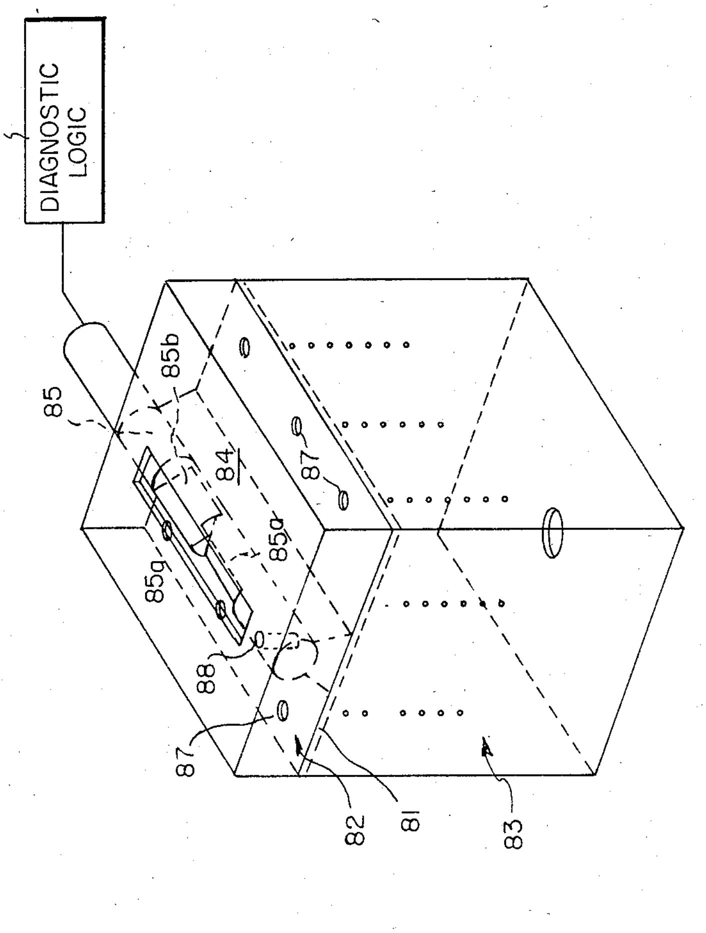
FIG. 4 is a schematic illustration, in perspective, of a portion of the embodiment of the invention shown in FIG. 2.

Referring now to FIG. 4, as well as FIG. 2, it can be seen that the collection chamber 32 is divided by an interior wall 81 into an upper, inlet region 82, which receives the droplet streams from the print head assembly and a lower, ink-discharge region 83 which directs ink into return conduit 76. Mounted in a pedestaled condition on dividing wall 81 by spaced supports 84 is the sensing means 85 (e.g. an electrometer probe) for diagnostic logic circuit 86.

The sensing element 85 is located to receive the droplet streams from the print head assembly on its surface and detect charge condition of such droplets. This affords the capability of performing detections with less droplet charging than will deflect streams into the catcher and is useful in a variety of diagnostic techniques. One diagnostic approach with which a configuration in accord with the present invention is useful is disclosed in U.S. application Ser. No. 06/765,974, filed Aug. 15, 1985, entitled "Method and Apparatus for Phase Detection and Adjustment in Ink Jet Printers", by R. Wint; however, various other techniques using drop charge to detect and adjust filament break-up and information synchronization will be facilitated by the present invention.

In the embodiment shown in FIGS. 2 and 4, the sensing means comprises two surface portions 85*a* and 85*b* that are slanted to direct different droplet streams respectively into opposite sides of the upper region 82. As shown, the supports 84 divide the upper region into two separate reservoir portions. Each reservoir has a plurality of apertures 87 opening into the lower chamber region 83; however, in some applications the reservoirs might require only one aperture. That is, the filament length of ink passing through an orifice increases in proportion to the flow rate through the orifice and thus increases with an increasing liquid head above the orifice. The number and size of apertures 87 are selected so that, during full ink stream flow, the ink filaments issuing therefrom break into drip streams of ink drops at a location safely above the level of ink accumulation in the bottom of the lower region 83. It is also important that the orifices 87 be located in a spaced relation relative to the vertical side walls of the housing 30 that form the lower region 83. Specifically, the orifices 87 should be spaced sufficiently inwardly (e.g. 0.5 inches) from those vertical walls so that any ink coating formed on the vertical walls (e.g. by ink splash) will not bridge across the bottom surface of the divider wall 81 to form a contact with the ink issuing from orifices 87. To minimize formation of such an ink coating on those vertical side walls it is highly desirable that the bottom surfaces of the lower region 83 be inclined relative to the drip streams falling from the orifices 87. This minimizes the drip splash, which can initiate coating of the vertical walls. By virtue of constructions as described above, the sensing means 85 is not electrically coupled by any continuous ink flows from its surface to the lower region's discharge conduit 76. Thus the charge imparted to the sensing means is only from the charged droplets coming from the print head assembly. The charge imparted to the sensing means 85 is not drained by an electrical circuit path formed by any conductive ink masses that extent continuously from the ink supply reservoir, through conduit 76 and into the upper region 82 of the housing 30. That is, the upper region 82 is electrically decoupled from the lower region 83.

Also, any residual charge in the ink supply is not transmitted to the sensing means via such an ink circuit path. Although the ink supply at system ground potential, in the ink supply does have a residual charge that is capable of causing a current, e.g. approximately 2000 nanoamps. Because the sensing means can be operating with currents in the order of 500 nanoamps, any coupling of the reservoir potential to the sensing means can swamp the desired signal that represents droplet charge.

It is highly desirable to prevent air locks or surges in the flow through apertures 87. That is, fluxuations of ink flow through orifices 87 can result from oscillating vacuum pressure in the discharge conduit 76, caused by the two phase (liquid/gas) return flow to the ink reservoir. To prevent air locks and ink surges fluxuation of ink flow through orifices 87, both the upper and lower regions 82 and 83 are vented to atmosphere during diagnosis by circuit 86. However, it is also desirable that both chambers be sealed from the atmosphere when the print head is in a storage mode (i.e. with the seals 37 and 38 engaged with the print head assembly). To accomplish these purposes, a vent passage 88 is provided through probe 85 (at a position that is not impacted by the droplet streams, see FIG. 4) into the zone between supports 84, which is isolated from all ink flows. Another vent passage 89 extends through wall 81 at a location beneath the supports 84 so that atmospheric air can pass through vents 88 and 89 into chamber 83 when the housing 30 is in its non-sealing, diagnostic position. When seal 37 engages the print head 25, the upper region and lower region are both simultaneously sealed from the external atmosphere in a simple manner.

Figure 5:
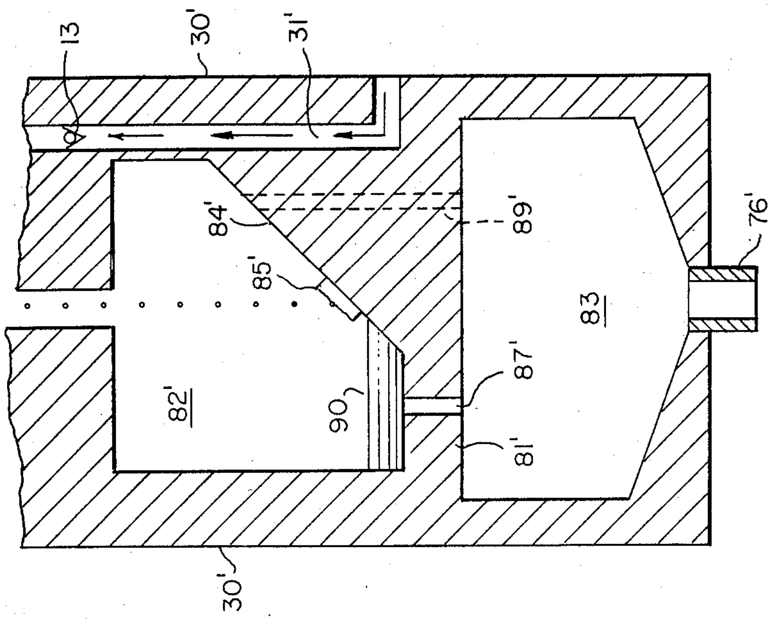
FIG. 5 is a cross-sectional view of another embodiment of the present invention.

FIG. 5 discloses an alternative embodiment of the invention and portions similar to the FIG. 4 embodiment are designated with prime numerals. In this embodiment the sensing means 85' is supported on a ramped support surface 84' within upper region 82'. A vent passage 89' extends through an upper portion of the ramp to provide atmospheric pressure in the lower region when the housing 30' is in its lowered, diagnostic position. In this embodiment a flow separator wall 90 is spaced midway between the ends of the sensing element to divide flow off from the sensing element into separate reservoirs. Again, each reservoir has its own apertures 87'.

Thus it will be appreciated that the present invention provides improved home station configurations which facilitate a variety of diagnostic techniques for ink jet printing apparatus and that such configurations cooperate advantageously in other storage and start-up functions of the printing apparatus.

The invention has been described in detail with particular reference to preferred embodiments thereof, but it will be understood that variations and modifications can be effected within the spirit and scope of the invention.

What is claimed is:

1. In ink jet printing apparatus of the type having a print head assembly that: (i) includes means for producing droplet streams, means for charging selected droplets in those streams and means for catching selectively charged droplets and (ii) is movable across a printing region and into a nonprinting position adjacent the printing region, an improved print head assembly home station comprising:

(a) means, located at said non-printing position, for collecting droplet streams from said print head assembly;

(b) means, located within said collecting means, for sensing electrical charge conditions of droplets in said streams;

(c) means for returning ink from said collecting means for recirculation to said print head assembly; and (d) isolating means, located and extending a substantial distance into said collecting means, for forming an electrical decoupling between ink contacting said sensing means and ink in said returning means.

2. The invention defined in claim 1 wherein said isolating means comprises wall means separating said collecting means into an upper, droplet-stream-inlet region and a lower ink-outlet region and orifice means for allowing ink to drip through said wall means.

3. The invention defined in claim 2 wherein said wall means forms separate reservoirs for the ink of such droplet streams and each reservoir includes drip forming orifice means.

4. The invention defined in claim 3 wherein said collecting means includes means for deflecting different groups of said droplet streams into different respective reservoirs.

5. The invention defined in claim 4 wherein said sensing means constitutes said deflecting means.

6. The invention defined in claim 1 wherein said collecting means and said print head assembly are relatively movable between a storage position sealing portions of said assembly from the external atmosphere and a non-sealing position.

7. The invention defined in claim 2 wherein said ink outlet region includes means for venting that region to the atmosphere and said relative movement of said sealing position seals said venting means.

8. The invention defined in claim 6 wherein said ink outlet region is vented to the atmosphere via said ink inlet region.

9. The invention defined in claim 8 wherein said venting means has an ingress within said inlet region of said collecting means at a location above the zone of ink accumulation therein.

10. In ink jet printing apparatus of the type having a print head assembly that includes: (i) orifice means for producing droplet streams and (ii) means for charging droplets in those streams, the improvement comprising:

(a) a home station housing including means engage and seal said orifice and charging means from the ambient atmosphere;

(b) means, mounted within said housing, for receiving droplet streams from said print head assembly and for sensing electrical charge conditions of droplets in said streams;

(c) means for returning ink from said housing for recirculation to said print head assembly; and (d) isolating means, located and extending a substantial distance into said housing, for forming an electrical decoupling between ink contacting said sensing means and ink in said returning means.

11. The invention defined in claim 10 wherein said isolating means comprises wall means separating said housing into (i) an upper, droplet-stream-inlet region and (ii) a lower ink-outlet region and orifice means for allowing ink to drip through said wall means.

12. The invention defined in claim 11 wherein said wall means forms separate reservoirs for the ink of such droplet streams and each reservoir includes drip forming orifice means.

13. The invention defined in claim 12 wherein said sensing includes means for deflecting different groups of said droplet streams into different respective reservoirs.

14. The invention defined in claim 10 wherein said housing and said print head assembly are relatively movable between a storage position sealing said orifice and said charging means from the external atmosphere and a non-sealing position.

15. The invention defined in claim 11 wherein said upper and lower regions includes means for venting them to the atmosphere and said relative movement to said sealing position seals said venting means.

16. The invention defined in claim 15 wherein said lower region is vented to the atmosphere via said upper region.

17. The invention defined in claim 16 wherein said venting means has an ingress within said upper region of said housing at a location above the level of ink accumulation therein.

18. The invention defined in claim 2 wherein said orifice means are spaced inwardly from the vertical walls of said collecting means.

19. The invention defined in claim 2 wherein the lower surface of said collecting means is inclined with respect to the drip path from said orifice means.

* * * * *